Patented Aug. 1, 1939

2,168,127

UNITED STATES PATENT OFFICE 2,168,127

METHOD OF MOLDING POLISHED CASEIN MATERIAL AND POLISHED CASEIN ARTICLES

Daniel Kasen, Newark, N. J.

No Drawing. Application May 26, 1936, Serial No. 81,967

14 Claims. (Cl. 18—47.5)

My invention relates to a method of producing polished casein material and polished casein articles.

An important object of the invention is to provide a chemical method for polishing the casein material and casein articles.

A further object of the invention is to provide a method for polishing uncured casein material, in the form of sheets, rods or the like, and also uncured casein articles, so that it is unnecessary to subsequently polish the completed cured article.

Other objects and advantages of the invention will be apparent during the course of the following description.

As far as I am aware, no one has chemically polished uncured casein material or uncured articles made from the same. I have discovered that if uncured casein material or articles are subjected to the action of a polishing chemical solution capable of acting upon the uncured casein material or uncured casein articles for polishing the same that the same will become polished thereby eliminating the necessity of subsequently polishing the completed cured casein articles.

As a preferred illustration of my method, I will present the chemical polishing of a sheet of uncured casein material, extruded or unextruded. If this sheet is to be used in the molding of articles in a cool mold, it would have a sufficient water content for that purpose, which would be from 20% to 50%. I chemically polish this sheet of uncured casein material by the use of an alkaline solution, such as an alkali metal hydroxide, such as sodium hydroxide or potassium hydroxide. I prefer to use sodium hydroxide as it is cheaper. I find that satisfactory results are obtainable by using a water solution of the sodium hydroxide wherein the sodium hydroxide is present by weight from 5% to 10%. In applying this alkaline solution to the uncured casein sheet, it is preferred to spray the alkaline solution thereon. The amount of the solution to be sprayed upon the uncured casein sheet will have to be determined largely by tests and observation. Where a solution having a sodium hydroxide content of from 5% to 10% by weight is being used, the spraying is continued until the surface of the sheet has acquired a suitable polish. When the strength of the solution is weaker, the spraying will have to continue for a greater length of time. Satisfactory results are obtainable by having the solution with a sodium hydroxide content of from 5% to 10% by weight, but this sodium hydroxide content may vary outside of these limits and may be less than 5%, especially if the solution is hot. While I prefer to apply the sodium hydroxide solution to the uncured casein sheet by spraying, it may also be applied by immersing or dipping the sheet into the solution, and allowing the same to remain immersed therein until the desired polished surface appears. After the uncured casein sheet is thus polished by the use of the alkaline solution it need not be washed but it is then dried to remove the excess water. In dipping, an alkaline solution stronger than 10% may be used, and I contemplate using a saturated solution or even a super-saturated solution.

After the drying step, this uncured casein sheet may be employed in molding casein articles, as set forth in my application for Method of producing molded articles from casein, filed April 24, 1936, Serial Number 76,283, which application has matured into Patent 2,045,471 under date of June 23, 1936. In accordance with the molding method disclosed in this pending application, the chemically polished sheet is heated to a molding temperature and hot blanks are stamped therefrom. Each hot blank is introduced into a cool mold, and therein subjected to pressure for molding the article. The molded article is allowed to cool and harden in the cool mold and is then removed and cured. By molding the polished blank in the cool mold, the molded article has its surface polished, which is preserved even after curing. Of course, blanks or like articles can be stamped from the uncured casein sheet before the sheet is chemically polished and these blanks heated and molded in a cool mold, to form the uncured casein articles, as described herein and in my said pending application, and these uncured molded articles treated with the alkaline solution to polish the same before they are cured.

Instead of employing an alkaline solution as a polishing agent, I have found that the uncured casein material, sheet, or article may be satisfactorily polished by using a concentrated acid solution, such as a concentrated sulphuric acid solution of 50% to 95%. This acid solution is applied to the uncured casein sheet, material or articles, by spraying or dipping, as described in connection with the use of the alkaline solution, and the action of the acid upon the sheet is watched and the spraying or dipping is stopped when the sheet acquires the desired polish. It may then be neutralized by an alkali. It is not necessary to wash the sheet after the neutralizing step and the same may be allowed to dry.

These polishing solutions may be hot or cold. It will be found that a hot solution may be used in the dipping method with a lower concentration, but I prefer to use the cold solution because of the simplicity in use.

I contemplate adding coloring matter to the acid or alkaline solution. When this is done, the outer layer of the exposed casein becomes colored. After the material thus treated is stamped or molded, and then cured or hardened, if the same is subsequently carved, a two-toned effect will be shown. The base color will show where the carving was done and the dyed color where the polishing was done.

It is to be understood that the forms of my invention herewith shown and described are to be taken as preferred examples of the same, and that various changes may be resorted to in the steps of the method, and in the temperatures and pressures and that known chemical equivalents may be employed without departing from the spirit of my invention or the scope of the subjoined claims.

Having thus described my invention, I claim:

1. The method of producing a polished molded casein article, comprising subjecting uncured casein material, having a suitable water content for molding in a cool mold, to the action of a polishing chemical solution capable of acting upon the uncured casein material to polish the surface of such material, then heating the polished moldable casein material to render the same plastic, and subjecting the same to pressure within a cool mold to mold the article while preserving the polished surface.

2. The method of producing a polished molded casein article, comprising subjecting uncured casein sheet material, having a suitable water content for molding in a cool mold, to the action of a polishing chemical solution capable of acting upon the uncured casein sheet material to polish the surface of such sheet, then heating the polished moldable sheet to render the same plastic, subjecting the same to pressure within a cool mold to mold the article while preserving the polished surface, and curing the molded article.

3. The method of polishing uncured casein material, comprising subjecting such material to the action of a polishing chemical solution capable of acting upon the uncured casein material to polish the surface of the same, and allowing the material thus treated to dry.

4. In a method of polishing uncured casein material, the step comprising subjecting such material to the action of a polishing chemical solution comprising an alkali.

5. The method of polishing a sheet of uncured casein material, comprising spraying the surface of such material with a polishing chemical solution comprising an alkali metal hydroxide until such surface is suitably polished.

6. The method of polishing a sheet of uncured casein material, comprising spraying the surface of such material with a polishing chemical solution comprising sodium hydroxide until such surface is suitably polished.

7. The method of polishing uncured casein material, comprising subjecting the same to the action of a polishing chemical solution comprising an acid.

8. The herein described method, comprising subjecting an extruded uncured casein material to the polishing action of a polishing chemical solution capable of acting upon the uncured casein material to polish the surface of the same, and then curing the casein material thus treated.

9. The herein described method, comprising extruding uncured casein material, subjecting such material to the action of a chemical polishing solution capable of acting upon the extruded uncured casein material to polish the surface of the same, and then subjecting the material thus treated to the action of formaldehyde to cure the same.

10. In the herein described method, the step of subjecting extruded uncured casein material to the polishing action of a chemical polishing solution capable of acting upon the extruded uncured casein material to polish the surface thereof.

11. The method of producing a polished molded casein article, comprising subjecting uncured casein sheet material having a suitable water content of 20% to 50% for molding in a cool mold to the action of a polishing chemical solution containing an alkali metal hydroxide to polish the surface of such sheet, then heating the polished sheet to render the same plastic, subjecting the same to pressure with a cool mold to mold the article while preserving the polished surface, allowing the molded article to cool and harden within the mold, and then curing the hardened molded article.

12. The method of producing a polished molded casein article, comprising subjecting uncured casein sheet material having a suitable water content of 20% to 50% for molding in a cool mold, to the action of a polishing chemical solution containing sodium hydroxide to polish the surface of such sheet, then heating the polished sheet to render the same plastic, subjecting the same to pressure within a cool mold to mold the article while preserving the polished surface, allowing the molded article to cool and harden within the mold, and then curing the molded article.

13. The method of producing a polished molded casein article, comprising subjecting uncured casein sheet material having a suitable water content of 20% to 50% for molding in a cool mold to the action of a polishing chemical solution containing an acid to polish the surface of such sheet, then heating the polished sheet to render the same plastic, subjecting the sheet thus treated to pressure within a cool mold to mold the article while preserving the polished surface, allowing the molded article to cool and harden within the mold, and curing the molded article.

14. The method of producing a polished molded casein article, comprising subjecting uncured casein sheet material having a suitable water content of 20% to 50% for molding in a cool mold, to the action of a chemical polishing solution consisting of a concentrated sulphuric acid solution to polish the surface of the relatively hard sheet, then heating the polished sheet to render the same plastic, subjecting the plastic sheet to pressure within a cool mold to mold the article while preserving the polished surface, allowing the molded article to cool and harden within the mold, and curing the molded article.

DANIEL KASEN.